Figure 1:
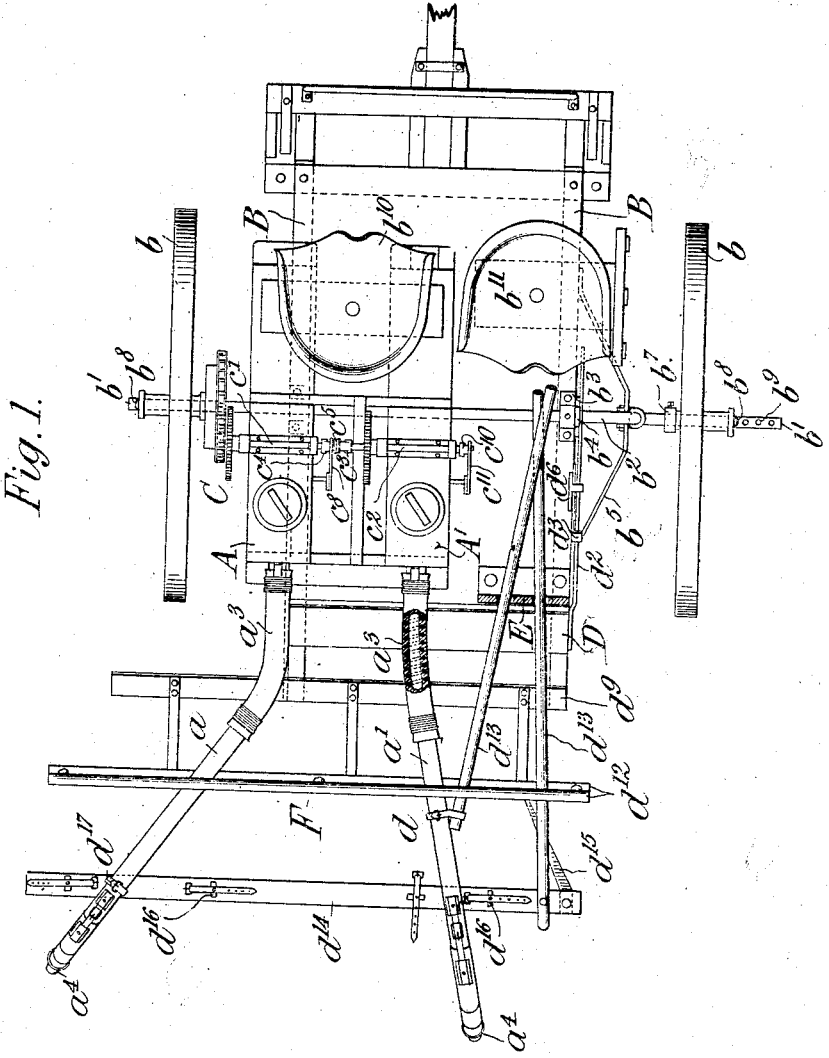

C. H. LEGGETT.
POWDER DISTRIBUTER.
APPLICATION FILED APR. 3, 1911.

1,033,811.

Patented July 30, 1912.
3 SHEETS—SHEET 1.

WITNESSES:
Rene Bruine
Fred White

INVENTOR:
Clinton H. Leggett,
By Attorneys.
Fraser Gurk & Myers

C. H. LEGGETT.
POWDER DISTRIBUTER.
APPLICATION FILED APR. 3, 1911.
1,038,811.
Patented July 30, 1912.
3 SHEETS—SHEET 2.
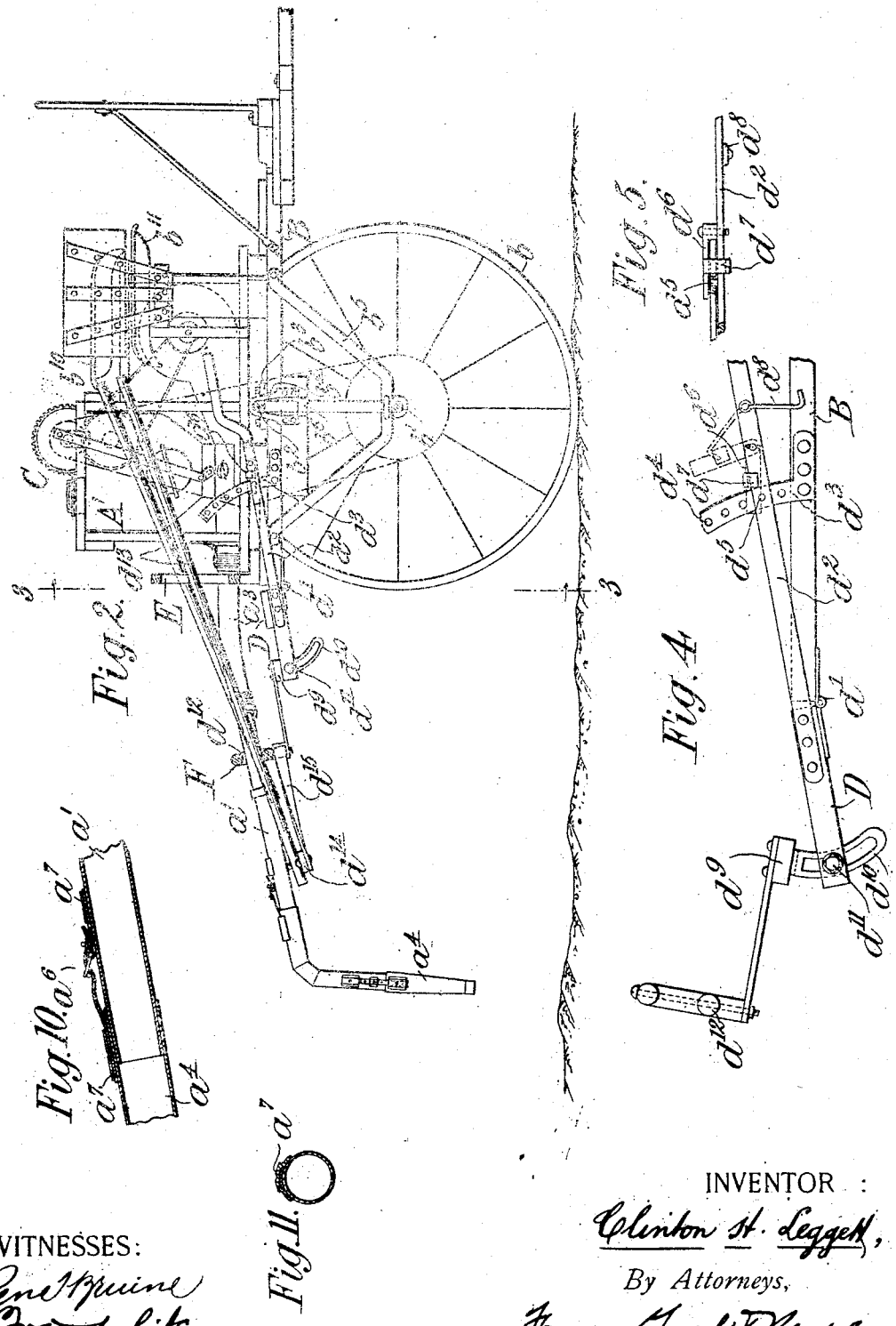
WITNESSES:
INVENTOR:
Clinton H. Leggett,
By Attorneys,

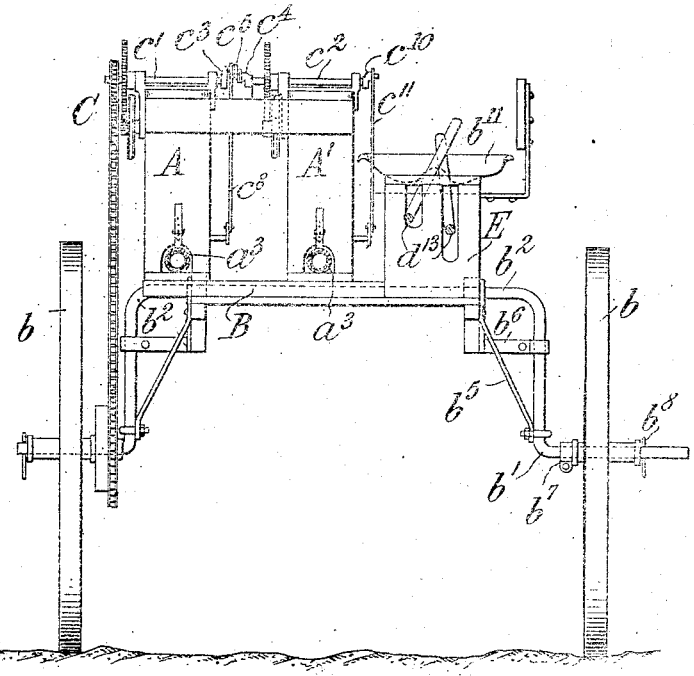
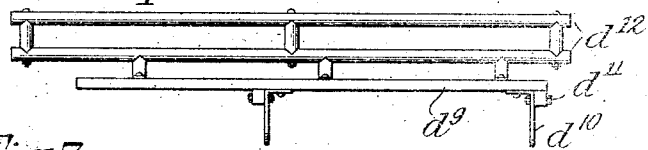
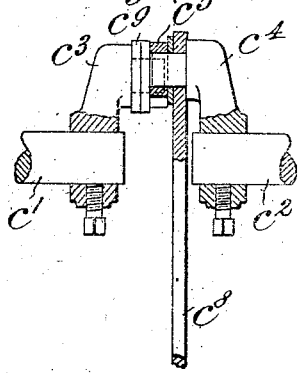
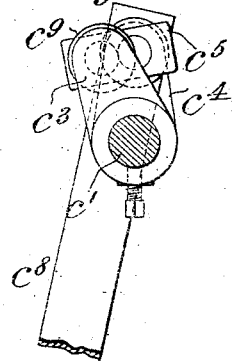
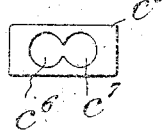

UNITED STATES PATENT OFFICE.

CLINTON H. LEGGETT, OF NEW YORK, N. Y.

POWDER-DISTRIBUTER.

1,033,811.   Specification of Letters Patent.   Patented July 30, 1912.

Application filed April 3, 1911. Serial No. 618,572.

*To all whom it may concern:*

Be it known that I, CLINTON H. LEGGETT, a citizen of the United States, residing in the city, county, and State of New York, have invented certain new and useful Improvements in Powder-Distributers, of which the following is a specification.

This invention relates to powder distributers or the like, and aims to provide certain improvements therein.

The device provided by my present invention is especially designed for distributing a powdered insecticide upon plants of considerable size which are ordinarily grown in parallel rows, such as cotton plants, its purpose being to simultaneously distribute the insecticide over several rows, though many of its features are applicable to insecticide distributers in general.

In distributing insecticide over a plurality of rows simultaneously it is found desirable to have an independent adjustment of the several distributing nozzles, in order that the nozzles may be trained upon or follow closely over the separate rows as the device moves along. The invention provides means for this purpose.

The invention further provides a separate distributer mechanism for each row, whereby the insecticide may be delivered under a considerable pressure or force, which is desirable in many instances, and particularly with cotton plants, and includes improved means for coupling the two distributer mechanisms to a single operating mechanism.

The invention further provides an improved mounting for the distributers adapting the device for use with high plants, an improved support or shelf for the distributing pipes and improvements in the construction and attachment of the delivery pipes and nozzles.

The device is preferably mounted on wheels and adapted to be drawn by a team of horses, though other means for running it may be employed, if desired.

The invention includes other features of improvement which will be hereinafter referred to.

Referring to the accompanying drawings, Figure 1 is a plan view of the device; Fig. 2 is a side elevation of the device, with the wheel on the near side removed; Fig. 3 is a vertical sectional view on the line 3—3, Fig. 2; Figs. 4 and 5 are enlarged detail views of parts of the support for the distributing pipe and nozzles, and Fig. 6 is a detached view of said support; Figs. 7, 8 and 9 are detail views of the coupling of the distributer mechanism; Figs. 10 and 11 are detail views of the couplings and fastenings of the distribution pipes and nozzles.

In said drawings A and $A^1$ designate two powder distributers or "dusters", preferably of the construction set forth in my U. S. Patents No. 831,669 and No. 840,141. These dusters are preferably mounted on a wheeled platform or cart B, and are preferably operated from a sprocket on one of the wheels through a transmission C preferably like that in my aforesaid Patent No. 831,669. These distributers act to feed insecticide from a reservoir and expel it by means of blowers.

$a$ and $a^1$ indicate distributer pipes connected to each of the dusters A and $A^1$, through which the insecticide is delivered from the distributers or "dusters". By providing each distributer-pipe with a separate "duster" the insecticide is supplied in a blast of considerable force, which is of advantage in applying insecticide to certain classes of plants, and particularly cotton plants above referred to, in order that the insecticide may be forced into the pods and the like. These distributer-pipes are preferably connected to the distributers through flexible connections $a^3$ of rubber tubing provided with a wire coil to prevent them from being crushed. The ends of the distributer pipes $a$ and $a^1$ are preferably provided with nozzles $a^4$, which may be of any suitable form and which may be made in a plurality of tubular sections, as shown.

The distributing pipes and nozzles are supported by a support or shelf D projecting from the rear of the platform B. The support is preferably hinged to the platform, as at $d^1$, in order that the support may be moved to different positions to adjust the height of the nozzle $a^4$. The adjustments of the support are preferably obtained by means of a lever $d^2$ attached to the support and engaging with a rack $d^3$ on the platform B. The rack may be provided with a plurality of holes $d^4$ and the lever may be provided with a stud $d^5$ and may be slightly flexible laterally in order that the stud $d^5$ may be moved into and out of engagement with the holes $d^4$ of the rack. In order to lock the lever $d^2$ in its adjusted positions it has preferably pivoted thereto a latch $d^6$, which latch is adapted to fall behind the rack $d^3$, when lever $d^2$ is in position, and prevent it from being sprung out of engagement. The latch $d^6$ is also preferably provided with a hooked projection $d^7$ adapted to extend over the lever and tie the latch and lever together. A hook $d^8$ is also preferably attached to the lever $d^2$ for holding the latch out of locking position when desired. The support D is further made adjustable by mounting the outer cross plank $d^9$ upon slotted bracket arms $d^{10}$ $d^{10}$. These slotted bracket arms are adapted to slide upon bolts $d^{11}$ $d^{11}$, which are adapted to be tightened to fix the bracket arms in an adjusted position.

Projecting from the support D is preferably a rack or guide $d^{12}$ through which the distributing pipes $a$ and $a^1$ project. The rack or guide acts to restrain the pipes vertically, but permits a practically free movement thereof horizontally.

Each of the distributer pipes and nozzles is preferably adapted for independent adjustment in order that it may be manipulated to closely follow the row of plants over which it extends. For this purpose there may be provided two handles or poles $d^{13}$ $d^{13}$, one of which may be directly attached to one of the distributing pipes, as $a^1$, and the other attached to the other distributing pipe, as $a$, through a connecting strip $d^{14}$. A retaining strap $d^{15}$ attached to rack $d^{12}$ retains the free end of the connecting strip in place.

The handles $d^{13}$ $d^{13}$ project over the platform in reach of the operator (who is preferably an extra hand seated on the platform with the driver) and pass through a slotted plate E in the rear of the platform, which acts as a fulcrum for the operating handles $d^{13}$ $d^{13}$. By manipulating either or both of the handles, the nozzles may be made to follow very closely over the rows of plants.

The connecting strip $d^{14}$ is provided with a plurality of eyelets $d^{16}$, through any one of which a strap $d^{17}$ may be passed to fasten the distributing pipe $a$ in an adjusted position. The connecting strip may be further provided with eyelets $d^{16}$ at its other end through which a strap may be passed to fasten the distributing pipe $a^1$ thereto in certain instances, in order that both pipes may be manipulated by one handle.

The nozzles $a^4$ are preferably made detachable and may be made in a plurality of sections, which permits the use of nozzles of different forms. The ends of the nozzles and sections preferably fit within one another, being provided with tapered ends and sockets for this purpose, and are held together by buckle and strap fastenings $a^5$. The straps are fastened to the nozzle and pipes by incasing their ends in a metallic band or casing $a^7$, indenting the band or casing, and soldering the metallic band to the pipe or nozzle.

The platform B is preferably mounted on wheels $b$ $b$ which are journaled on an axle $b^1$, having an arched portion $b^2$. The platform is suspended from the arched portion of the axle by blocks $b^3$ and hangers $b^4$ and is braced by the rods $b^5$ and $b^6$. This arrangement provides an elevated platform or support for the powder distributing mechanism and enables the device to pass over plants of considerable height. The width of the wheels apart may be varied by shifting the positions of one of the wheels on one end of axle $b^1$. This is accomplished by providing a collar $b^7$ on the axle which may be adjusted and fixed in different positions on the axle and correspondingly changing the location of a cotter pin $b^8$ used for retaining the wheel on the axle in a plurality of holes $b^9$ in the outer end of the axle. On the platform B are also preferably arranged a seat $b^{10}$ for the driver and a seat $b^{11}$ for the operator manipulating the handles of the distributing pipes and nozzles.

In order that the two "dusters" A and $A^1$ may be actuated by the one transmission gearing C, the two dusters are mounted on the platform side by side with their operating shafts $c^1$ $c^2$ in alinement. The adjacent ends of the shafts $c^1$ and $c^2$ are provided with cranks $c^3$ and $c^4$ and the two shafts are connected together by the link $c^5$ provided with the two holes $c^6$ and $c^7$ into which the ends of the cranks $c^3$ and $c^4$ fit. The end of one of the cranks projects through an eye of a connecting rod $c^8$, which is part of the "duster" mechanism A. The link $c^5$ may be offset on the other crank (which carries no rod $c^8$) by means of washers $c^9$. One or both of the cranks $c^3$ $c^4$ are preferably made adjustable on the shafts $c^1$ $c^2$ for convenience in connecting and assembling the parts. Shaft $c^2$ is provided at its outer end with a crank $c^{10}$ to which a connecting rod $c^{11}$ of the "duster" mechanism $A^1$, similar to the connecting rod $c^8$, is connected.

Modifications may be made in the constructions shown and described without departing from the spirit of the invention.

What I claim is:—

1. In a powder distributer, the combination of distributing mechanism, a plurality of independently movable distributing pipes, and fulcrumed handles having a free sliding and rocking movement at their fulcrum point, attached to said pipes whereby each may be manipulated individually to follow a given line, said pipes being supported independently of said handles.

2. In a powder distributer, the combination of distributing mechanism, a plurality of independently movable distributing pipes, a support for said pipes, a fulcrum and handles disconnected from said fulcrum, attached to said pipes, whereby each pipe may be manipulated individually to follow a given line, said pipes being supported independently of said handles.

3. In a powder distributer, the combination of distributing mechanism, a plurality of independently movable distributing pipes, a support for said pipes, a fulcrum and handles disconnected from and having universal and sliding movement upon said fulcrum, attached to said pipes, whereby each pipe may be manipulated individually to follow a given line.

4. In a powder distributer, the combination of a movable platform, distributing mechanism mounted thereon, a plurality of independently movable distributing pipes, a pivoted support on the rear of said platform, supporting said distributing pipes, means for adjusting the position of said support, and fulcrumed handles having a free sliding and rocking movement at their fulcrum point, attached to said distributing pipes whereby they may be manipulated individually.

5. In a powder distributer, the combination of a movable platform, distributing mechanism mounted thereon, a plurality of independently movable distributing pipes, a support for said distributing pipes, and a guide or frame on said support through which said distributing pipes pass and in which said pipes may be moved laterally.

6. In a powder distributer, the combination of a movable platform, distributing mechanism mounted thereon, a plurality of independently movable distributing pipes, handles for manipulating said pipes, a pivoted support for said distributing pipes, means for adjusting the position of said support, and a guide or frame on said support through which said distributing pipes pass.

7. In a powder distributer, the combination of a movable platform, distributing mechanism mounted thereon, a plurality of distributing pipes and a support for said distributing pipes having a vertically adjustable plank thereon, said plank providing for adjustment of the height of said pipes upon said support.

8. In a powder distributer, the combination of a movable platform, distributing mechanism mounted thereon, a plurality of distributing pipes, and a pivoted support for said distributing pipes having a vertically adjustable plank thereon, said plank providing for adjustment of the height of said pipes upon said support.

9. In a powder distributer, the combination of a movable platform, distributing mechanism mounted thereon, a plurality of distributing pipes, a pivoted support for said distributing pipes, an adjustable plank upon said support having slotted bracket arms attached thereto, and fastening bolts passing through said slotted bracket arms adapted to fasten said plank in its adjusted position, said plank providing for adjustment of the height of said pipes upon said support.

10. In a powder distributer, the combination of distributing mechanism, a plurality of independently movable distributing pipes, a slotted plate, handles fulcrumed in said plate and having a free sliding and rocking movement therein, attached to said pipes whereby they may be individually manipulated, said pipes being supported independently of said handles.

11. In a powder distributer, the combination of distributing mechanism, a plurality of independently movable distributing pipes, handles for said pipes, and a connecting rod between one of said pipes and one of said handles, said pipes being supported independently of said handles.

12. In a powder distributer, the combination of distributing mechanism, a plurality of independently movable distributing pipes, handles for said pipes, and a connecting rod adapted to be connected to one or more of said pipes, and having one of said handles connected thereto, said pipes being supported independently of said handles.

13. In a powder distributer, the combination of a movable platform, a plurality of coupled distributing mechanisms mounted thereon comprising operating shafts having crank arms thereon, a link connecting said crank arms, and a driving transmission connected to one of said operating shafts and operating the other through said link.

14. In a powder distributer, the combination of a movable platform, a plurality of coupled distributing mechanisms mounted thereon comprising operating shafts having crank arms thereon, and a link connecting said crank arms having two adjacent holes therein within which said crank arms project.

In witness whereof, I have hereunto signed my name in the presence of two subscribing witnesses.

CLINTON H. LEGGETT.

Witnesses:
GUSTAVE R. THOMPSON,
FRED WHITE.